(12) United States Patent
Sedayao et al.

(10) Patent No.: US 9,767,324 B2
(45) Date of Patent: Sep. 19, 2017

(54) TRANSPARENT EXECUTION OF SECRET CONTENT

(71) Applicant: Intel Corporation, Santa Clara, CA (US)

(72) Inventors: Jeffrey C Sedayao, San Jose, CA (US); Ivan Jibaja, San Jose, CA (US); Srikanth Varadarajan, Hillsboro, OR (US); Reshma Lal, Hillsboro, OR (US); Soham Jayesh Desai, Atlanta, GA (US)

(73) Assignee: INTEL CORPORATION, Santa Clara, CA (US)

( * ) Notice: Subject to any disclaimer, the term of this patent is extended or adjusted under 35 U.S.C. 154(b) by 157 days.

(21) Appl. No.: 14/550,959

(22) Filed: Nov. 22, 2014

(65) Prior Publication Data

US 2016/0147982 A1    May 26, 2016

(51) Int. Cl.
  *G06F 21/12*      (2013.01)
  *G06F 21/84*      (2013.01)

(52) U.S. Cl.
  CPC .......... *G06F 21/84* (2013.01); *G06F 21/123* (2013.01); *G06F 2221/2125* (2013.01)

(58) Field of Classification Search
  None
  See application file for complete search history.

(56) References Cited

U.S. PATENT DOCUMENTS

| 6,986,052 B1* | 1/2006 | Mittal | G06F 12/1441 |
| | | | 711/E12.097 |
| 2002/0116632 A1* | 8/2002 | Itoh | G06F 21/10 |
| | | | 726/34 |
| 2003/0177400 A1* | 9/2003 | Raley | G06F 21/10 |
| | | | 713/168 |
| 2009/0044253 A1* | 2/2009 | Interlandi | G06F 21/10 |
| | | | 726/4 |
| 2009/0119780 A1 | 5/2009 | Ham | |
| 2010/0146267 A1* | 6/2010 | Konetski | G06F 21/53 |
| | | | 713/164 |

(Continued)

OTHER PUBLICATIONS

International Search Report and Written Opinion received for PCT Application No. PCT/US2015/056951, mailed Mar. 31, 2016, 13 pages.

(Continued)

*Primary Examiner* — Malcolm Cribbs
(74) *Attorney, Agent, or Firm* — Grossman, Tucker, Perreault & Pfleger, PLLC

(57) ABSTRACT

The present application is directed to transparent execution of secret content. A device may be capable of downloading content that may include at least one secret portion, wherein any secret portions of the content may be directed to a secure workplace in the device not accessible to device operating system components, applications, users, etc. The device may then present the content in a manner that allows secret portions of the content to be executed without direct access. For example, the device may download content, and a director module in the device may direct any secret portions of the downloaded content to a secure workspace. During execution of the content, any inputs required by the secret portions may be provided to the secure workspace, and any resulting outputs from the secret portions may then be used during content presentation.

24 Claims, 3 Drawing Sheets

(56) References Cited

U.S. PATENT DOCUMENTS

| | | | |
|---|---|---|---|
| 2010/0241855 A1* | 9/2010 | Chou | G06F 21/10 713/168 |
| 2011/0061110 A1 | 3/2011 | Koeten et al. | |
| 2011/0141124 A1* | 6/2011 | Halls | G06F 21/83 345/522 |
| 2011/0161667 A1* | 6/2011 | Poornachandran | G06F 21/84 713/168 |
| 2013/0042295 A1* | 2/2013 | Kelly | G06F 21/53 726/1 |
| 2013/0205401 A1* | 8/2013 | Lin | G06F 21/10 726/26 |
| 2013/0337777 A1* | 12/2013 | Deutsch | H04W 12/06 455/411 |
| 2014/0047548 A1 | 2/2014 | Bye et al. | |
| 2014/0122820 A1 | 5/2014 | Park et al. | |
| 2014/0157438 A1 | 6/2014 | Seleznev et al. | |
| 2015/0121487 A1* | 4/2015 | Chastain | H04L 63/0869 726/6 |
| 2016/0112203 A1* | 4/2016 | Thom | H04L 9/3247 713/176 |
| 2016/0117660 A1* | 4/2016 | Prakash | G06Q 20/202 705/14.64 |

OTHER PUBLICATIONS

International Preliminary Report on Patentability and Written Opinion issued in PCT Application No. PCT/US2015/056951, dated Jun. 1, 2017, 10 pages.

* cited by examiner

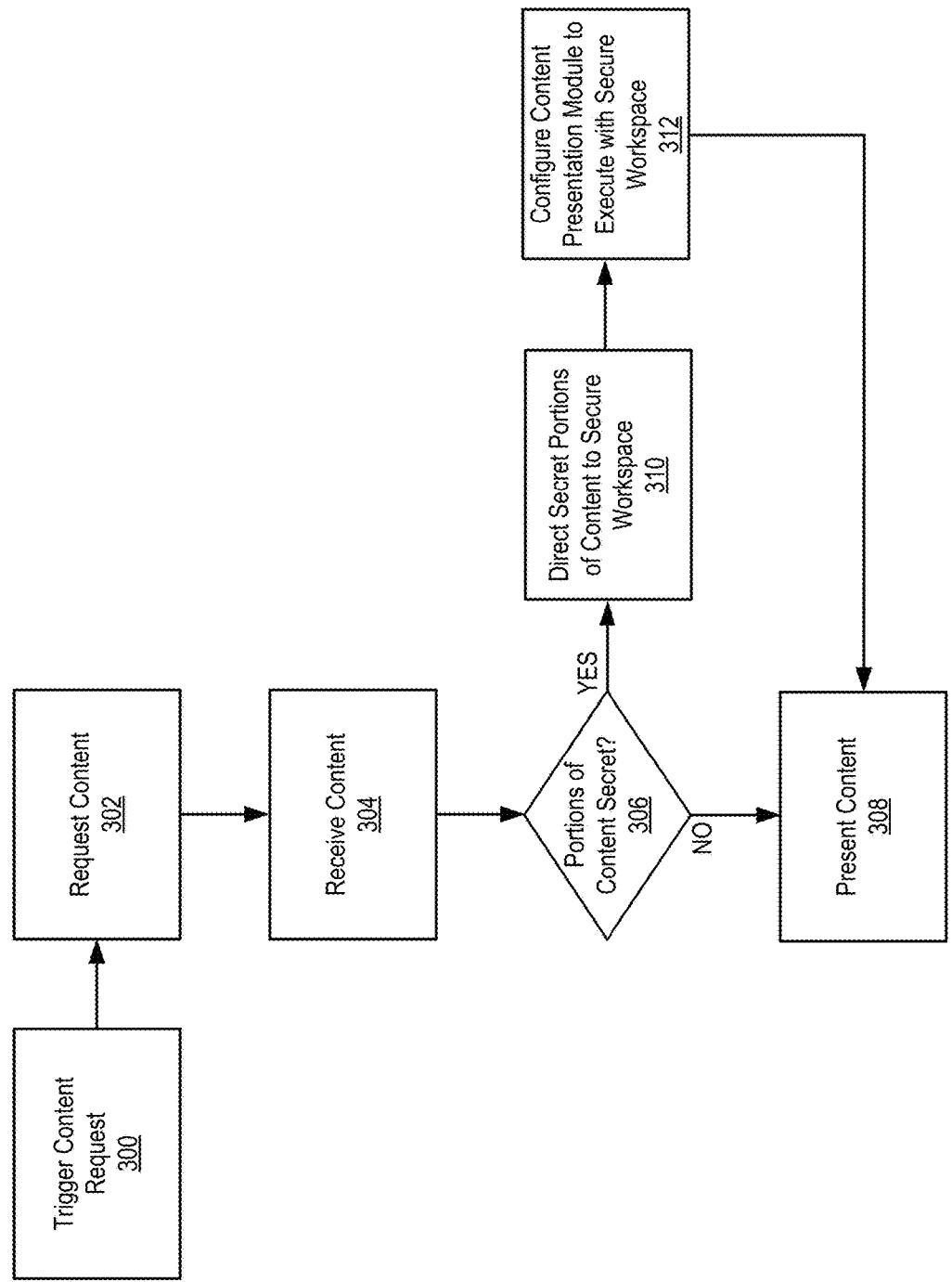

TRANSPARENT EXECUTION OF SECRET CONTENT

TECHNICAL FIELD

The present disclosure relates to content security, and more particularly, to a system that allows secret portions of content to be executed in a user device in a way transparent to the user.

BACKGROUND

Continuous advances in modern communication technology have increased the amount of online content that users consume. Online content may include, for example, text, audio and/or video delivered via a web browser, via proprietary applications, etc. Users may be able to access online content at their residence, at their workplace and at all points in-between via their mobile device. The ability to access online content at any time from virtually any location has created a substantial demand for content providers. While many traditional content providers such as, for example, print media, television producers, movie producers, game developers, etc. are moving to provide digital delivery and streaming, at least one issue that continues to be problematic is the protection of proprietary content. Proprietary content may include, for example, code and/or other programmatic constructs placed on an end user device to support the presentation of online content. While content providers may need to, or at least desire to, place proprietary content on an end user device, they also want to protect the content so that it cannot be usurped by others.

Traditionally, content providers relied on legal agreements or encryption to protect their proprietary information. Legal agreements provide no protection without vigilant enforcement, which may add substantially to the cost of doing business. Encryption may provide protection, but has the unintentional side effect of serving as an enticement for users that enjoy overcoming it (e.g., hackers). As a result, any type of encryption will be a target for hackers to circumvent, ultimately rendering the encryption useless and the proprietary data exposed. As a result of this vulnerability, content providers must either risk their proprietary content being exposed to end users or must resist placing any valuable data on the end user's device. A solution that is fully executed by a remote resource (e.g., that does not place any data on the end user's device) may place a substantially high processing burden on the content provider's equipment (e.g., network, servers, etc.), which may result in higher operating cost and poor quality of experience for users.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3 illustrates example operations for transparent execution of secret content in accordance with at least one embodiment of the present disclosure.

Figure 1:
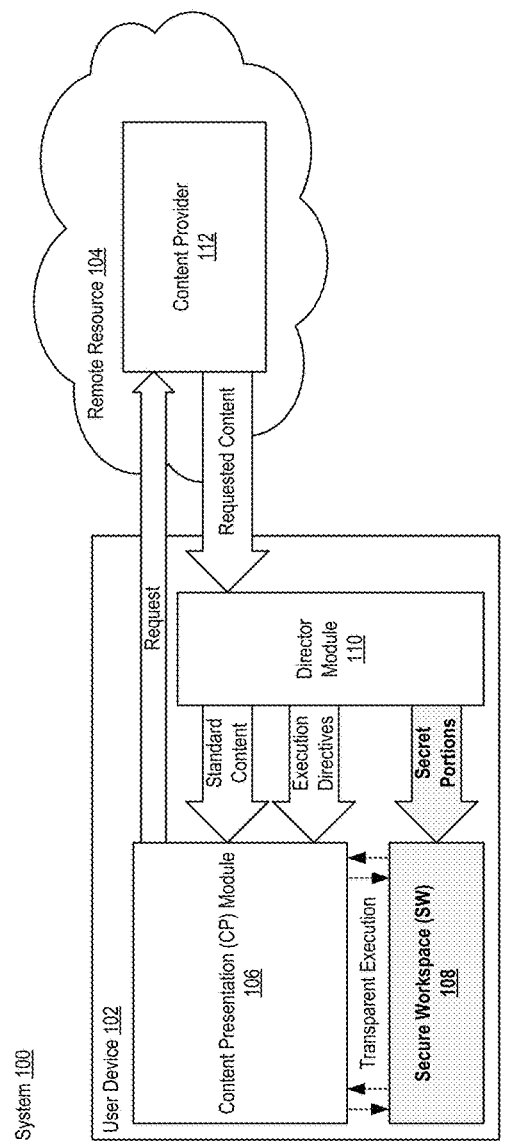
FIG. 1 illustrates an example system for transparent execution of secret content in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to transparent execution of secret content. In at least one embodiment, a device may be capable of downloading content that may include at least one secret portion, wherein any secret portions of the content may be directed to a secure workplace in the device not accessible to device operating system components, applications, users, etc. The device may present the downloaded content to a user in a manner that executes secret portions of the content without direct access. For example, the device may download content, and a director module in the device may direct any secret portions of the content to a secure workspace. When a content presentation module presents the content, any inputs required by the secret portions of the content may be provided to the secure workspace. The secret portions of the content may be executed within the protection of the secure workspace, and any outputs resulting from execution of the secret portions of the content may then be returned to the content presentation module.

In at least one embodiment, a device for transparently executing secret portions of content may comprise, for example, a communication module, a content presentation module, a secure workspace and a director module. The communication module may be to interact with at least a remote resource. The content presentation module may be to at least cause content received from the remote resource via the communication module to be presented by the device. The secure workspace may be to execute at least one secret portion of the content. The director module may be to direct the at least one secret portion of the content to be loaded into the secure workspace.

In at least one embodiment, the content presentation module may further be to cause the communication module to request the content from the remote resource. An example content presentation module may comprise a web browser. The director module may be to direct the at least one secret portion of the content to be loaded into the secure workspace based on at least one of a name, type or attribute associated with the at least one secret portion of the content. The attribute associated with the secret portion of the content may be, for example, an element attribute as defined in Hypertext Markup Language (HTML).

In the same or a different embodiment, the director module may further be to indicate to the content presentation module that the at least one secret portion of the content is loaded in the secure workspace. The at least one secret portion of the content loaded in the secure workspace may be inaccessible to the content presentation module. When executing the at least one secret portion of the content the secure workspace may be to receive at least one input from the content presentation module, generate at least one output by executing the at least one secret portion of the content in the secure workspace utilizing the at least one input and provide the at least one output to the content presentation module. An example method for transparently executing secret portions of content, consistent with the present disclosure, may comprise receiving content from a remote resource into a device, determining whether any portions of the content are secret, directing any portions of content determined to be secret into a secure workspace in the device and executing the content in the device, wherein any secret portions of the content are executed within the secure workspace.

FIG. 1 illustrates an example system 100 for transparent execution of secret content in accordance with at least one embodiment of the present disclosure. System 100 may comprise, for example, at least user device 102 and remote resource 104. Examples of user device 102 may comprise, but are not limited to, a mobile communication device such as a cellular handset or smartphone based on the Android® OS from the Google Corporation, iOS® and/or Mac® OS from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Nexus® from the Google Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a smart television, small form factor computing solutions (e.g., for space-limited applications, TV set-top boxes, etc.) like the Next Unit of Computing (NUC) platform from the Intel Corporation, etc. Remote resource 104 may comprise at least one computing device accessible to user device 102 via a network connection. Example networks may include, but are not limited to, a local-area network (LAN), a wide-area network (WAN) like the Internet, a global-area network (GAN), etc. In at least one embodiment, remote resource 104 may comprise at least one data server operating as part of a cloud computing architecture. A cloud computing architecture may comprise, for example, a plurality of data servers operating individually or in unison to provide various data processing-related services to user device 102.

User device 102 may comprise, for example, at least content presentation (CP) module 106, secure workspace (SW) 108 and director module 110. CP module 106 may be configured to cause user device 102 to present content. "Content," as referenced herein, may comprise data instructions and/or other programmatic objects/elements, along with any external files that may be targeted by the execution of the programmatic elements such as multimedia source files (e.g., text, audio, video files). In general, the "presentation" of content may comprise the initiation of various executable programs within the content that may result in, for example, the visual and/or audible presentation of multimedia data to a user of user device 102. In at least one embodiment, CP module 106 may comprise at least a web browser application that may allow a user to browse the web, view web pages, download content, etc. Examples of web browsers may include, but are not limited to, Internet Explorer from the Microsoft Corporation, Firefox and Opera from the Mozilla project, Safari from the Apple Corporation, etc. CP module 106 may be able to present content by, for example, executing instructions in a programming language specifically designed for the delivery of online content such as, for example, Hypertext Markup Language (HTML). A web browser may interpret instructions coded in HTML to cause user device 102 to present web pages comprising a variety of visual objects, interfaces, embedded audio and/or video media, etc.

SW 108 may comprise, for example, at least one trusted execution environment (TEE) in which known-good programs may execute, confidential information may be stored in a secure manner, etc. In general, SW 108 may comprise a set of computing resources that are secure such that programs executing within SW 108, and any data associated with these executing programs, are isolated from the rest of user device 102. Outside actors cannot be interfere with or observe the programs/data within SW 108 during program execution with the exception that the program may be started or stopped and the associated data may be inserted or deleted. Any data leaving SW 108 may be released in a controlled manner. In one example implementation, SW 108 may employ Software Guard Extensions (SGX) technology developed by the Intel Corporation. SGX may provide a secure, hardware-encrypted computation and storage area within system memory, the contents of which cannot be deciphered by privileged code or even through the application of hardware probes to memory bus. When SW 108 is protected by SGX, embodiments consistent with the present disclosure make it impossible for intruders to decipher the contents of SW 108. Protected data cannot be observed outside of SGX, and thus, is inaccessible outside of SGX.

In an example implementation wherein SW 108 is implemented using SGX, the identity of programs (e.g., based on a cryptographic hash measurement of each program's contents) may be signed and stored inside each program. When the programs are then loaded into SW 108, the processor may verify that the measurement of the program (e.g., as computed by the processor) is identical to the measurement previously embedded inside the program. The signature used to sign the embedded measurement is also verifiable because the processor may be provided with a public key used to verify the signature at program load time. Malware cannot tamper with the program because its verifiable measurement would also be altered. Malware also cannot spoof the signature because the signing key is secure with the program's author. Thus, the software may not be read, written to or altered by any malware. Data may also be protected in SW 108. For example, known-good programs executing in SW 108 may encrypt a variety of data such as keys, passwords, licenses, etc. so that only verified good programs may decrypt this data. In at least one embodiment, SW 108 may comprise at least one secure memory space in which secret portions of content may execute. All of the secret portions of content may reside in the same SW 108, or more than one separate instance of SW 108 may each house a different secret portion of the content. Utilizing multiple separate instances of SW 108 may utilize more resources in user device 102, but may also provide better security for the secret portions of content because one instance of SW 108 being compromised (e.g., corrupted) may not affect the integrity of the other instances of SW 108, allowing the remaining instances to remain intact, functional and secure.

Director module 110 may work in conjunction with CP module 106 and SW 108 to set up content for presentation in user device 102. Initially, director module 110 may indicate portions of content that should be loaded into SW 108. For example, director module 110 may comprise a list or table of content that should be directed to SW 108. This information may be coded into director module 110 when loaded into user device 102, may be provided to director module 110 when other programs are loaded into user device 102 (e.g., when CP module 106 is loaded into user device 102) or may be provided when content is loaded. For example, remote resource 104 may comprise content provider 112 to provide content to user device 102. Content provider 112 may include, for example, at least one server for distributing content owned by a content creator, content distributor, etc. In at least one embodiment, content provider 112 may instruct director module 110 (e.g., as part of the content download) which portions of the content are secret, and thus, need to be directed to SW 108. For example, the instructions from content provider 112 may be encrypted using a key set distributed between director module 110 and content provider 112 to avoid instructions being intercepted and altered prior to receipt by director module 110.

Secret portions of content received in user device 102 may be directed to SW 108 based on criteria such as, for example, name, type, attribute, etc. Using HTML as an example, HTML version 5 (HTML5) may comprise attributes such as, but not limited to, "media" that specifies a type of media resource, "src" that specifies a URL of the media file and "type" that specifies the media type of the media resource. In at least one embodiment, portions of content that are to be kept secret from end users may be coded with specific attributes that director module 110 knows to direct to SW 108. Director module 110 may also be configured to inform CP module 106 of which portions of code are stored in SW 108. While CP module 106 cannot access the contents of SW 108 directly, the two modules need to interact when content is presented in a manner that allows for "transparent execution" of the content (e.g., that allows the content to fully presented to the user, but still protects secret portions of the content from being exposed). In at least one embodiment, CP module 106 may treat SW 108 as a "black box" component. More specifically, CP module 106 cannot view the contents of SW 108, but may simply invoke a secret portion of the content by name, which may then cause SW 108 to execute at least the secret portion of the content. As part of the invocation, CP module 106 may also submit inputs to SW 108 and then receive output from SW 108. When an input is received from CP module 106, SW 108 may then execute at least one secret portion of content corresponding to the input, and may then return an output from execution of the at least one secret portion of code to CP module 106. For example, the secret portion of content may be a video decoder, the input may be an encoded video, and the output may be a decoded version of the video for presentation on user device 102. Alternatively, SW 108 may comprise a proprietary data processing algorithm (e.g., data mining algorithm, web results filtering algorithm, key generation and/or verification algorithm, etc.) wherein the input to SW 108 may comprise raw data and the output may comprise processed data. In an example of operation, CP module 106 may initially transmit a request for content to content provider 112 in remote resource 104. Content provider 112 may transmit the requested content to user device 102, which director module 110 may direct to various destinations. "Standard" content (e.g., any portion of the received content that is determined not to be secret) may be directed to CP module 106. Any portions of the content that director module 110 determines to be secret (e.g., based on name, type, attribute, etc.) may be directed to SW 108. Director module 110 may further provide execution directives that, for example, instruct CP module 106 which portions of content reside in SW 108. CP module 106 may then operate in conjunction with SW 108 to present the content. While not shown in FIG. 1, in at least one embodiment the functionality of director module 110 may be integrated into CP module 106. Given this configuration, CP module 106 may handle directing any secret portions of the content to SW 108, and thus, will already be aware of what portions of the content are accessible in SW 108 when needed during execution of the content.

Figure 2:
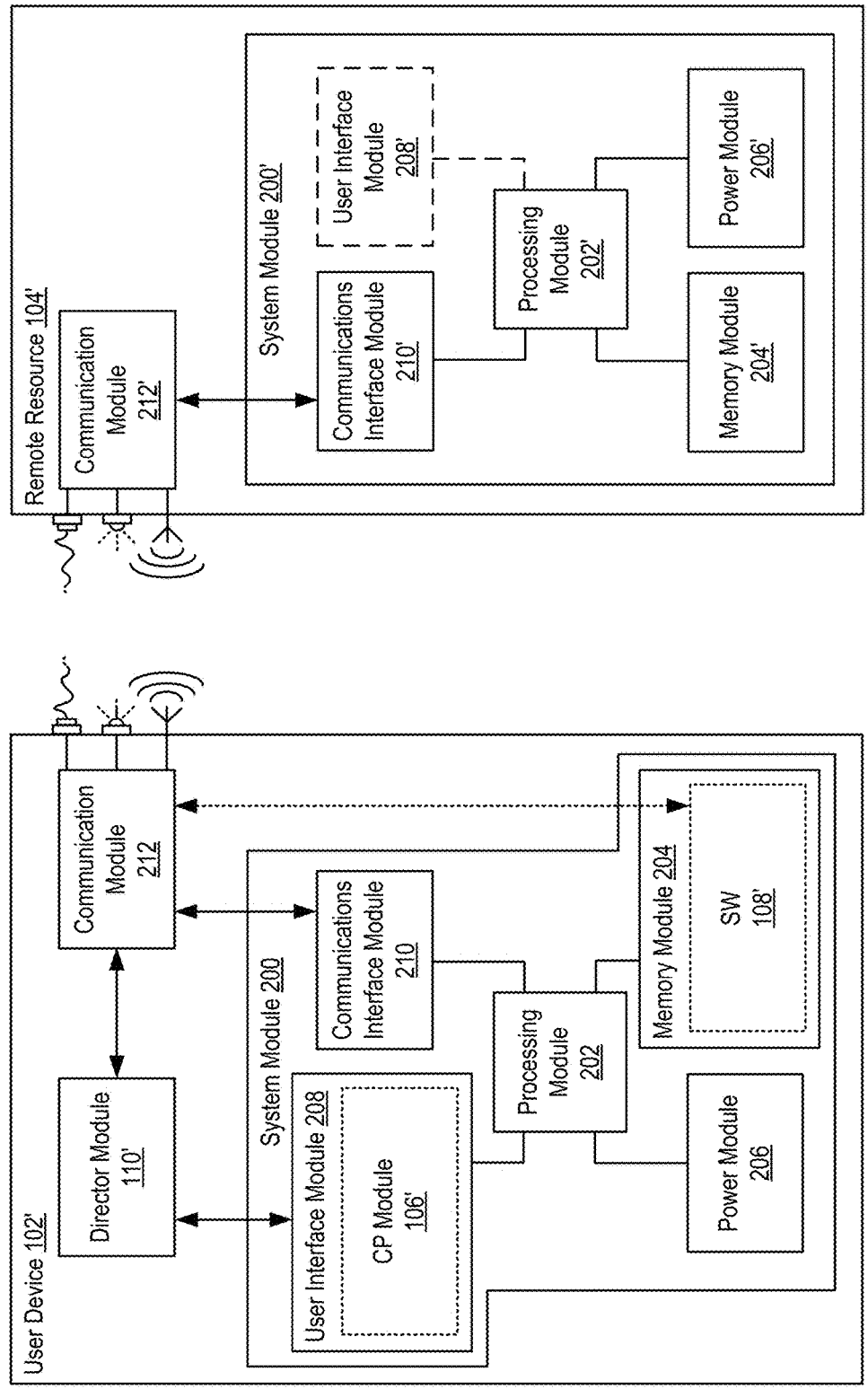
FIG. 2 illustrates example configurations for a user device and at least one device making up a remote resource in accordance with at least one embodiment of the present disclosure.

FIG. 2 illustrates example configurations for user device 102 and at least one device making up a remote resource 104 in accordance with at least one embodiment of the present disclosure. User device 102' and/or remote resource 104' may be capable of performing example functionality such as disclosed in FIG. 1. However, user device 102' and remote resource 104' are meant only as examples of apparatuses that may be usable in embodiments consistent with the present disclosure, and are not meant to limit these various embodiments to any particular manner of implementation.

User device 102' may comprise, for example, system module 200 configured to manage device operations. System module 200 may include, for example, processing module 202, memory module 204, power module 206, user interface module 208 and communication interface module 210. User device 102' may also communication module 212 and director module 110'. While communication module 212 and director module 110' have been shown as separate from system module 200, the example implementation illustrated in FIG. 2 has been provided merely for the sake of explanation. Some or all of the functionality associated with communication module 212 and/or director module 110' may be incorporated into system module 200.

In user device 102', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in user device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in user device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of user device 102' such as, for example, static RAM (SRAM) or Dynamic RAM (DRAM). ROM may include non-volatile (NV) memory modules configured based on BIOS, UEFI, etc. to provide instructions when user device 102' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, external fuel cell, etc.), and related circuitry configured to supply user device 102' with the power needed to operate. User interface module 208 may include hardware and/or software to allow users to interact with user device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware supporting user interface module 208 may be incorporated within user device 102' and/or may be coupled to user device 102' via a wired or wireless communication medium.

Communication interface module 210 may be configured to manage packet routing and other control functions for communication module 212, which may include resources configured to support wired and/or wireless communications. In some instances, user device 102' may comprise more than one communication module 212 (e.g., including separate physical interface modules for wired protocols and/or wireless radios) managed by a centralized communication interface module 210. Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, director module 110' may interact with at least user interface module 212 and communication module 212. In an example of operation, at least part of CP module 106' residing in user interface module 208 (e.g., including a web browser presented on a display in user device 102') may receive input from a user indicating content to be downloaded. CP module 106' and/or director module 110' may then cause communication module 212 to send a request for the content via communication module 212 to remote resource 104'. Remote resource 104' may comprise computing resources that are substantially similar to user device 102' including, for example, system module 200', processing module 202', memory module 204', power module 206', user interface module 208', communications interface module 210' and communication module 212'. Additions or subtractions to modules 200' to 212' may be based on the particular implementation of remote resource 104'. For example, given remote resource 104' comprises a rack server (e.g., implemented in a cloud computing architecture), some or all of user interface module 208' may be omitted to save space for processors, storage, etc., the user interface functionality being provided by a remote client station when required.

Remote resource 104' may then proceed to transmit the desired content to user device 102' via communication module 212'. In at least one embodiment, director module 110' may direct communication module 212 to provide any secret portions of the received content to SW 108' residing in memory module 204. Any standard content may be directed to CP module 106' residing, at least in part, in user interface module 208. Upon presenting the content, CP module 106' may interact with at least SW 108' to obtain functionality required from the secret portions of content. The collaborative execution being performed between CP module 106' and SW 108' may be transparent to the user, who can only observe the resulting presentation of the content.

FIG. 3 illustrates example operations for transparent execution of secret content in accordance with at least one embodiment of the present disclosure. Initially, in operation 300 a request to download content may be triggered. A request may be triggered by, for example, a user interacting with a user interface/content presentation module in a user device, an application being activated and/or manipulated in the user device, a service at a content provider that pushes out content, etc. The content may requested in operation 302 and then received in operation 304. A determination may then be made in operation 306 as to whether any portions of the content are secret. The determination may be based on, for example, information stored in the user device, information provided by the content provider or a combination of device/provider information.

If it is determined in operation 306 that the content does not comprise at least one secret portion, then in operation 308 the content may be presented (e.g., may be executed fully in a content presentation module in the user device). If in operation 306 it is determined that the content comprises at least one secret portion, then in operation 310 any secret portions of the content may be directed to be stored in a secure workspace in the user device. In operation 312, the content presentation module may be configured to execute with the secure workspace. For example, the content presentation module may be informed of the secret portions of content that are stored in the secure workspace so that these portions of code may be properly invoked during presentation of the content in operation 308. Invocation of the secure portion of the content may comprise, for example, providing at least one input to the secure workspace when execution of at least one secure portion of the content is required, and the receiving at least one output resulting from execution of the at least one secure portion of the content.

While FIG. 3 illustrates operations according to an embodiment, it is to be understood that not all of the operations depicted in FIG. 3 are necessary for other embodiments. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to transparent execution of secret content. A device may be capable of downloading content that may include at least one secret portion, wherein any secret portions of the content may be directed to a secure workplace in the device not accessible to device operating system components, applications, users, etc. The device may then present the content in a manner that allows secret portions of the content to be executed without direct access. For example, the device may download content, and a director module in the device may direct any secret portions of the downloaded content to a secure workspace. During execution of the content, any inputs required by the secret portions may be provided to the secure workspace, and any resulting outputs from the secret portions may then be used during content presentation.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for transparent execution of secret content, as provided below.

According to example 1 there is provided a device for transparently executing secret portions of content. The device may comprise a communication module to interact with at least a remote resource, a content presentation module to at least cause content received from the remote resource via the communication module to be presented by the device, a secure workspace to execute at least one secret portion of the content and a director module to direct the at least one secret portion of the content to be loaded into the secure workspace.

Example 2 may include the elements of example 1, wherein the content presentation module is further to cause the communication module to request the content from the remote resource.

Example 3 may include the elements of any of examples 1 to 2, wherein the content presentation module comprises a web browser.

Example 4 may include the elements of any of examples 1 to 3, wherein the director module is to direct the at least one secret portion of the content to be loaded into the secure workspace based on at least one of a name, type or attribute associated with the at least one secret portion of the content.

Example 5 may include the elements of example 4, wherein the attribute associated with the secret portion of the content is an element attribute as defined in Hypertext Markup Language (HTML).

Example 6 may include the elements of example 5, wherein the element attribute is the "src" HTML element attribute.

Example 7 may include the elements of any of examples 1 to 6, wherein the director module is further to indicate to the content presentation module that the at least one secret portion of the content is loaded in the secure workspace.

Example 8 may include the elements of any of examples 1 to 7, wherein the at least one secret portion of the content loaded in the secure workspace is inaccessible to the content presentation module.

Example 9 may include the elements of any of examples 1 to 8, wherein in executing the at least one secret portion of the content the secure workspace is to receive at least one input from the content presentation module, generate at least one output by executing the at least one secret portion of the content in the secure workspace utilizing the at least one input and provide the at least one output to the content presentation module.

Example 10 may include the elements of any of examples 1 to 9, wherein the secure workspace is based on Software Guard Extensions (SGX) technology.

According to example 11 there is provided a method for transparently executing secret portions of content. The method may comprise receiving content from a remote resource into a device, determining whether any portions of the content are secret, directing any portions of content determined to be secret into a secure workspace in the device and executing the content in the device, wherein any secret portions of the content are executed within the secure workspace.

Example 12 may include the elements of example 11, and may further comprise requesting the content from the remote resource.

Example 13 may include the elements of any of examples 11 to 12, wherein the content is executed in the device using a web browser.

Example 14 may include the elements of any of examples 11 to 13, wherein the at least one secret portion of the content is directed to be loaded into the secure workspace based on at least one of a name, type or attribute associated with the at least one secret portion of the content.

Example 15 may include the elements of example 14, wherein the attribute associated with the secret portion of the content is an element attribute as defined in Hypertext Markup Language (HTML).

Example 16 may include the elements of example 15, wherein the element attribute is the "src" HTML element attribute.

Example 17 may include the elements of any of examples 11 to 16, and may further comprise indicating to a content presentation module in the device that any secret portions of the content are loaded in the secure workspace.

Example 18 may include the elements of example 17, wherein any secret portions of the content loaded in the secure workspace are inaccessible to the content presentation module.

Example 19 may include the elements of any of examples 17 to 18, wherein executing any secret portions of the content within the secure workspace comprises receiving at least one input from the content presentation module, generating at least one output by executing the at least one secret portion of the content in the secure workspace utilizing the at least one input and providing the at least one output to the content presentation module.

Example 20 may include the elements of any of examples 11 to 19, wherein the secure workspace is based on Software Guard Extensions (SGX) technology.

According to example 21 there is provided a system including at least a device and a remote resource, the system being arranged to perform the method of any of the above examples 11 to 20.

According to example 22 there is provided a chipset arranged to perform the method of any of the above examples 11 to 20.

According to example 23 there is provided at least one machine readable medium comprising a plurality of instructions that, in response to be being executed on a computing device, cause the computing device to carry out the method according to any of the above examples 11 to 20.

According to example 24 there is provided a device configured for transparently executing secret portions of content, the device being arranged to perform the method of any of the above examples 11 to 20.

According to example 25 there is provided a system for transparently executing secret portions of content. The system may comprise means for receiving content from a remote resource into a device, means for determining whether any portions of the content are secret, means for directing any portions of content determined to be secret into a secure workspace in the device and means for executing the content in the device, wherein any secret portions of the content are executed within the secure workspace.

Example 26 may include the elements of example 25, and may further comprise means for requesting the content from the remote resource.

Example 27 may include the elements of any of examples 25 to 26, wherein the content is executed in the device using a web browser.

Example 28 may include the elements of any of examples 25 to 27, wherein the at least one secret portion of the content is directed to be loaded into the secure workspace based on at least one of a name, type or attribute associated with the at least one secret portion of the content.

Example 29 may include the elements of example 28, wherein the attribute associated with the secret portion of the content is an element attribute as defined in Hypertext Markup Language (HTML).

Example 30 may include the elements of example 29, wherein the element attribute is the "src" HTML element attribute.

Example 31 may include the elements of any of examples 25 to 30, and may further comprise means for indicating to a content presentation module in the device that any secret portions of the content are loaded in the secure workspace.

Example 32 may include the elements of example 31, wherein any secret portions of the content loaded in the secure workspace are inaccessible to the content presentation module.

Example 33 may include the elements of any of examples 31 to 32, wherein the means for executing any secret portions of the content within the secure workspace comprise means for receiving at least one input from the content presentation module, means for generating at least one output by executing the at least one secret portion of the content in the secure workspace utilizing the at least one input and means for providing the at least one output to the content presentation module.

Example 34 may include the elements of any of examples 25 to 33, wherein the secure workspace is based on Software Guard Extensions (SGX) technology.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device for transparently executing secret portions of content, comprising:
   communication circuitry configured to interact with at least a remote resource;
   content presentation circuitry configured to at least cause content received from the remote resource via the communication module to be presented by the device;
   secure workspace circuitry configured to execute at least one secret portion of the content, wherein said secure workplace circuitry is not accessible to device operating system components, applications, and users; and
   director circuitry configured to receive a list or table for directing content when the content is loaded, determine whether the content comprises at least one secret portion and, if the content is determined to comprise at least one secret portion, direct the at least one secret portion of the content to be loaded into the secure workspace circuitry based on the list or table.

2. The device of claim 1, wherein the content presentation circuitry is further configured to cause the communication circuitry to request the content from the remote resource.

3. The device of claim 1, wherein the content presentation circuitry comprises a web browser.

4. The device of claim 1, wherein the director circuitry is configured to direct the at least one secret portion of the content to be loaded into the secure workspace circuitry based on at least one of a name, type or attribute associated with the at least one secret portion of the content.

5. The device of claim 4, wherein the attribute associated with the secret portion of the content is an element attribute as defined in Hypertext Markup Language (HTML).

6. The device of claim 1, wherein the director circuitry is further configured to indicate to the content presentation circuitry that the at least one secret portion of the content is loaded in the secure workspace circuitry.

7. The device of claim 1, wherein the at least one secret portion of the content loaded in the secure workspace circuitry is inaccessible to the content presentation circuitry.

8. The device of claim 1, wherein in executing the at least one secret portion of the content the secure workspace circuitry is configured to:
   receive at least one input from the content presentation circuitry;
   generate at least one output by executing the at least one secret portion of the content in the secure workspace circuitry utilizing the at least one input; and
   provide the at least one output to the content presentation circuitry.

9. A method for transparently executing secret portions of content, comprising:
   receiving content from a remote resource into a device;
   receiving a list or table for directing content when the content is loaded;
   determining whether any portions of the content are secret based on the list or table;
   directing any portions of content determined to be secret into secure workspace circuitry in the device, wherein said secure workplace circuitry is not accessible to device operating system components, applications, and users; and
   executing the content in the device, wherein any secret portions of the content are executed within the secure workspace circuitry.

10. The method of claim 9, further comprising:
    requesting the content from the remote resource.

11. The method of claim 9, wherein the content is executed in the device using a web browser.

12. The method of claim 9, wherein the at least one secret portion of the content is directed to be loaded into the secure workspace circuitry based on at least one of a name, type or attribute associated with the at least one secret portion of the content.

13. The method of claim 12, wherein the attribute associated with the secret portion of the content is an element attribute as defined in Hypertext Markup Language (HTML).

14. The method of claim 9, further comprising:
    indicating to content presentation circuitry in the device that any secret portions of the content are loaded in the secure workspace circuitry.

15. The method of claim 14, wherein any secret portions of the content loaded in the secure workspace circuitry are inaccessible to the content presentation circuitry.

16. The method of claim 14, wherein executing any secret portions of the content within the secure workspace circuitry comprises:
    receiving at least one input from the content presentation circuitry;
    generating at least one output by executing the at least one secret portion of the content in the secure workspace circuitry utilizing the at least one input; and
    providing the at least one output to the content presentation circuitry.

17. At least one non-transitory machine-readable storage medium having stored thereon, individually or in combination, instructions for transparently executing secret portions of content that, when executed by one or more processors, cause the one or more processors to:
    receive content from a remote resource into a device;
    receive a list or table for directing content when the content is loaded;
    determine whether any portions of the content are secret based on the list or table;
    direct any portions of content determined to be secret into secure workspace circuitry in the device, wherein said secure workplace is not accessible to device operating system components, applications, and users; and
    execute the content in the device, wherein any secret portions of the content are executed within the secure workspace circuitry.

18. The medium of claim 17, further comprising instructions that, when executed by one or more processors, cause the one or more processors to:
    request the content from the remote resource.

19. The medium of claim 17, wherein the content is executed in the device using a web browser.

20. The medium of claim 17, wherein the at least one secret portion of the content is directed to be loaded into the secure workspace circuitry based on at least one of a name, type or attribute associated with the at least one secret portion of the content.

21. The medium of claim 20, wherein the attribute associated with the secret portion of the content is an element attribute as defined in Hypertext Markup Language (HTML).

22. The medium of claim 17, further comprising instructions that, when executed by one or more processors, cause the one or more processors to:
    indicate to content presentation circuitry in the device that any secret portions of the content are loaded in the secure workspace circuitry.

23. The medium of claim 22, wherein any secret portions of the content loaded in the secure workspace circuitry are inaccessible to the content presentation circuitry.

24. The medium of claim 22, wherein the instructions for executing any secret portions of the content within the secure workspace circuitry comprise instructions that, when executed by one or more processors, cause the one or more processors to:
    receive at least one input from the content presentation circuitry;
    generate at least one output by executing the at least one secret portion of the content in the secure workspace circuitry utilizing the at least one input; and
    provide the at least one output to the content presentation circuitry.

* * * * *